United States Patent [19]

Jervis

[11] Patent Number: 5,013,877
[45] Date of Patent: May 7, 1991

[54] DEVICES FOR ELECTRICAL CONNECTION
[75] Inventor: James E. Jervis, Atherton, Calif.
[73] Assignee: Raychem Corporation, Menlo Park, Calif.
[21] Appl. No.: 189,087
[22] Filed: May 2, 1988

Related U.S. Application Data

[63] Continuation-in-part of Ser. No. 153,188, Feb. 8, 1988.
[51] Int. Cl.[5] .............................................. H01H 1/26
[52] U.S. Cl. ..................... 200/523; 200/321
[58] Field of Search .......... 200/523, 322, 321, 153 D, 200/159 A; 439/912, 147

[56] References Cited

U.S. PATENT DOCUMENTS

| | | | |
|---|---|---|---|
| 1,675,352 | 7/1928 | Joyce | 200/523 |
| 2,499,958 | 3/1950 | Knowlton | 200/50 A |
| 3,294,927 | 12/1966 | Hill | 200/520 |
| 3,573,408 | 4/1971 | Farrell | 200/517 X |
| 3,867,005 | 2/1975 | Hoppe, Jr. . | |
| 3,882,296 | 5/1975 | Townsend | 200/246 |
| 3,972,581 | 8/1976 | Oldham | 439/201 |
| 3,980,380 | 9/1976 | Cieniawa et al. . | |
| 3,992,072 | 11/1976 | Anhalt et al. . | |
| 4,036,545 | 7/1977 | Mysiak et al. . | |
| 4,062,614 | 12/1977 | Gressitt et al. . | |
| 4,070,557 | 1/1978 | Ostapovitch | 200/51.1 |
| 4,183,607 | 1/1980 | Hughes . | |
| 4,190,748 | 2/1980 | Langford | 200/5 A |
| 4,206,962 | 6/1980 | Shue, Jr. et al. | 200/51.04 |
| 4,425,017 | 1/1984 | Chan | 439/276 |
| 4,426,121 | 1/1984 | Stoewe et al. . | |
| 4,435,034 | 3/1984 | Aujla et al. | 439/404 |
| 4,438,303 | 3/1984 | Astier | 200/51.1 |
| 4,446,342 | 5/1984 | Roberts | 200/533 X |
| 4,478,477 | 10/1984 | Fleisher . | |
| 4,481,388 | 11/1984 | Gillam et al. | 200/51 R |
| 4,516,819 | 5/1985 | Le Magourou . | |
| 4,519,668 | 5/1985 | Fujita et al. . | |
| 4,590,343 | 5/1986 | Berta et al. | 200/282 |
| 4,628,159 | 12/1986 | Deitch et al. | 200/51.05 |
| 4,634,209 | 1/1987 | Forberg et al. . | |
| 4,645,285 | 2/1987 | Cozzens et al. . | |
| 4,652,070 | 3/1987 | Suffi . | |
| 4,658,104 | 4/1987 | Koizumi et al. | 200/512 |
| 4,662,692 | 5/1987 | Uken et al. | 439/426 |
| 4,687,888 | 8/1987 | Hasircoglu | 200/51.1 |
| 4,696,860 | 9/1987 | Epperson | 428/325 |
| 4,697,331 | 10/1987 | Boulitrop et al. | 437/82 |
| 4,710,544 | 12/1987 | Wolfe, Jr. | 525/194 |
| 4,710,593 | 12/1987 | Hall, Jr. et al. | 174/88 R |
| 4,718,678 | 1/1988 | Vansant | 277/1 |

FOREIGN PATENT DOCUMENTS

| | | |
|---|---|---|
| 1019041 | 10/1977 | Canada . |
| 1108270 | 6/1961 | Fed. Rep. of Germany . |
| 2816776 | 6/1979 | Fed. Rep. of Germany . |
| 3312301 | 10/1982 | Fed. Rep. of Germany . |
| 3116162 | 11/1982 | Fed. Rep. of Germany . |
| 3314634 | 10/1984 | Fed. Rep. of Germany . |
| 8515441 | 10/1984 | Fed. Rep. of Germany . |
| 2250191 | 5/1975 | France . |
| 1596979 | 9/1981 | United Kingdom ............... 200/523 |

Primary Examiner—Renee S. Luebke
Attorney, Agent, or Firm—A. Stephen Zavell; Herbert G. Burkard

[57] ABSTRACT

A telephone junction box has two or more switches each of which comprises two resilient conductors that can be sprung between a first configuration in which they are in electrical contact and a second configuration in which they are separated. The conductors preferably include insulation displacement means.

21 Claims, 5 Drawing Sheets

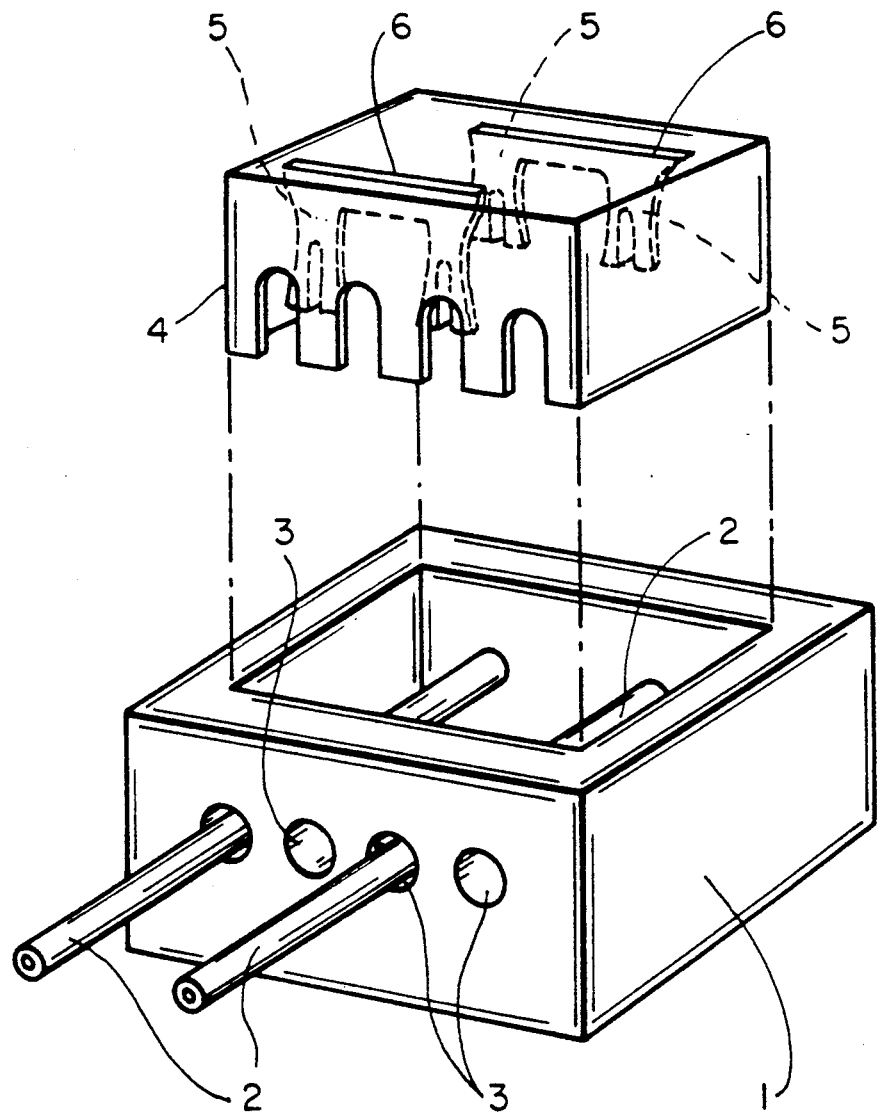
FIG_1
(PRIOR ART)

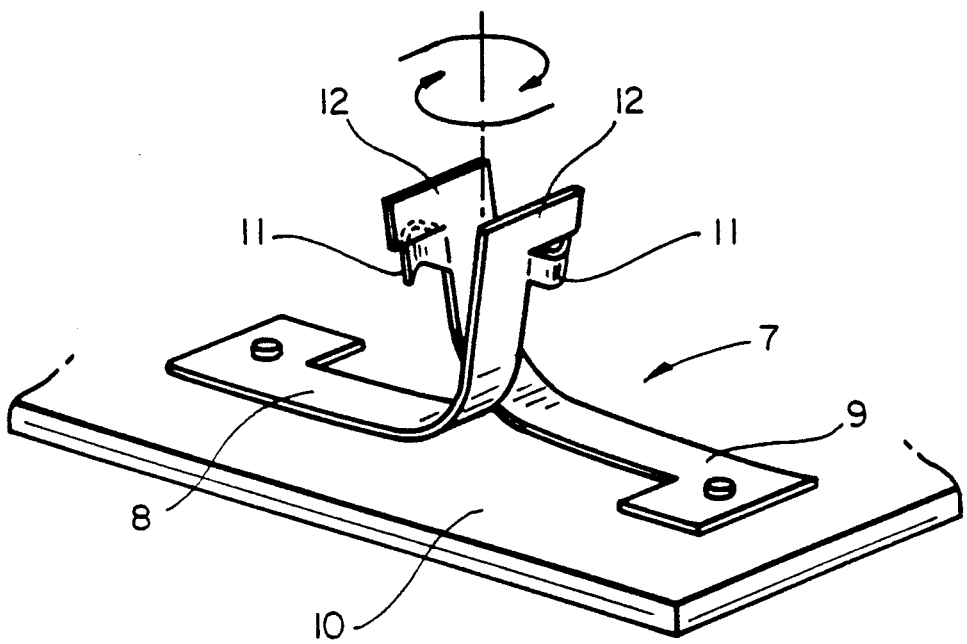
FIG_2A
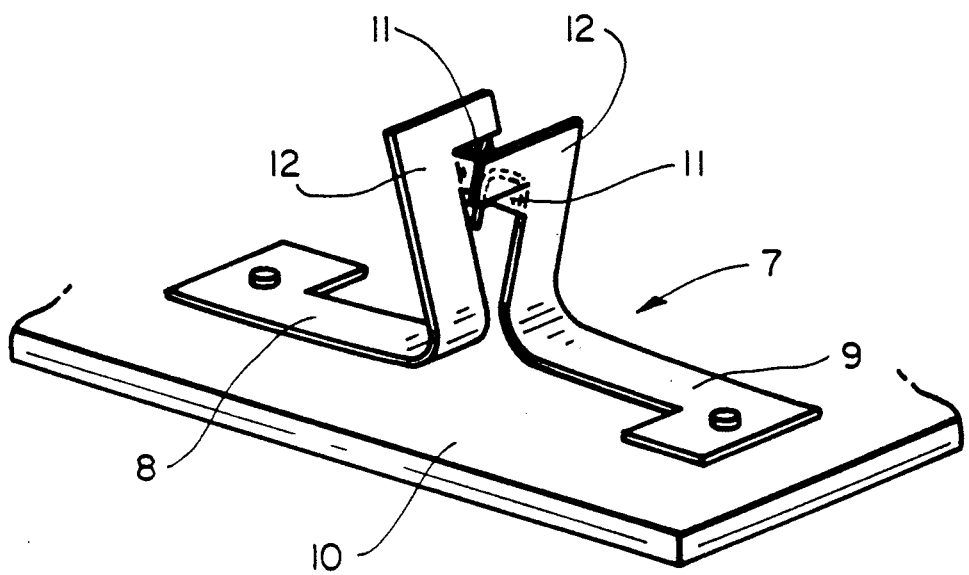
FIG_2B

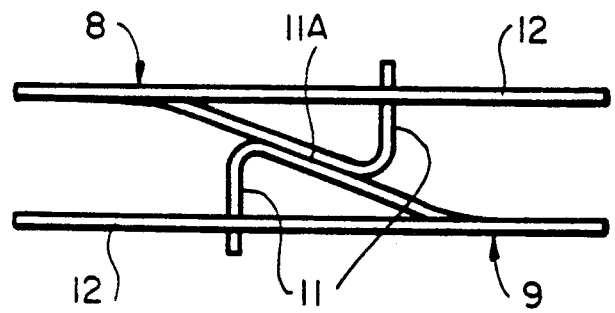
FIG_2C
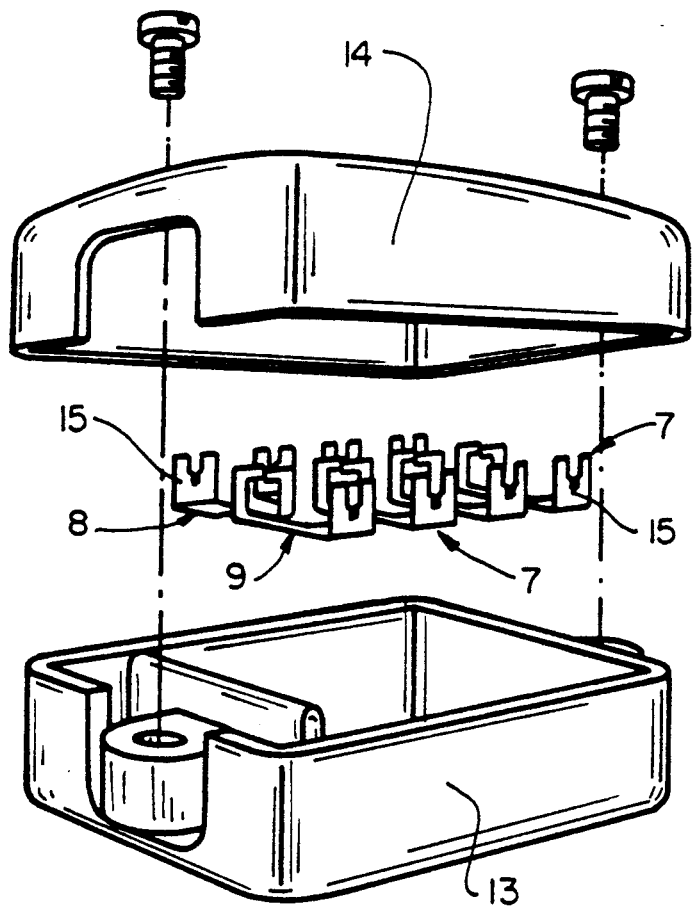
FIG_3

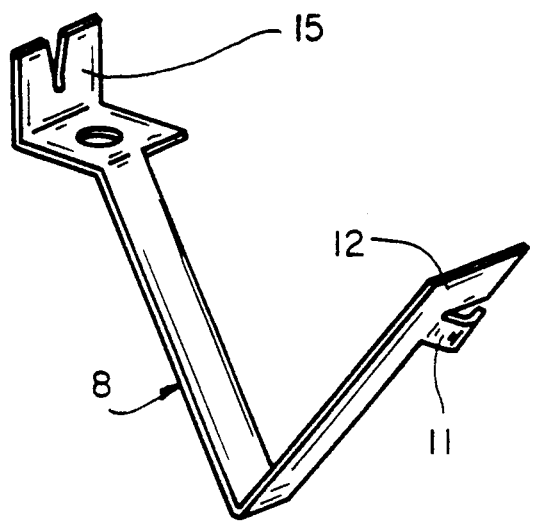
FIG_4
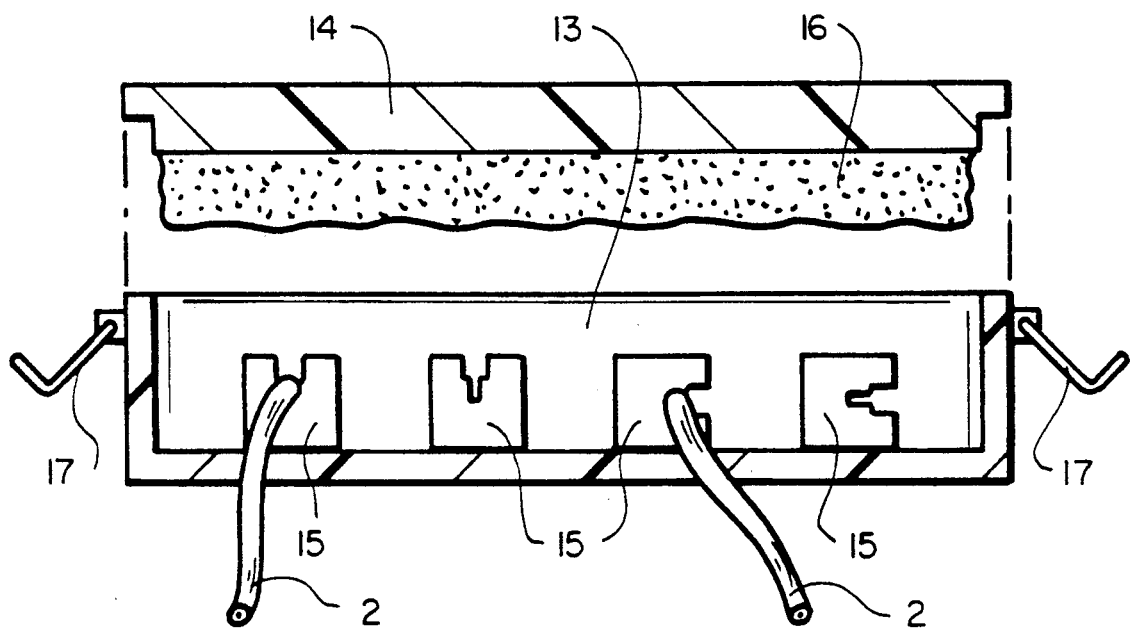
FIG_5

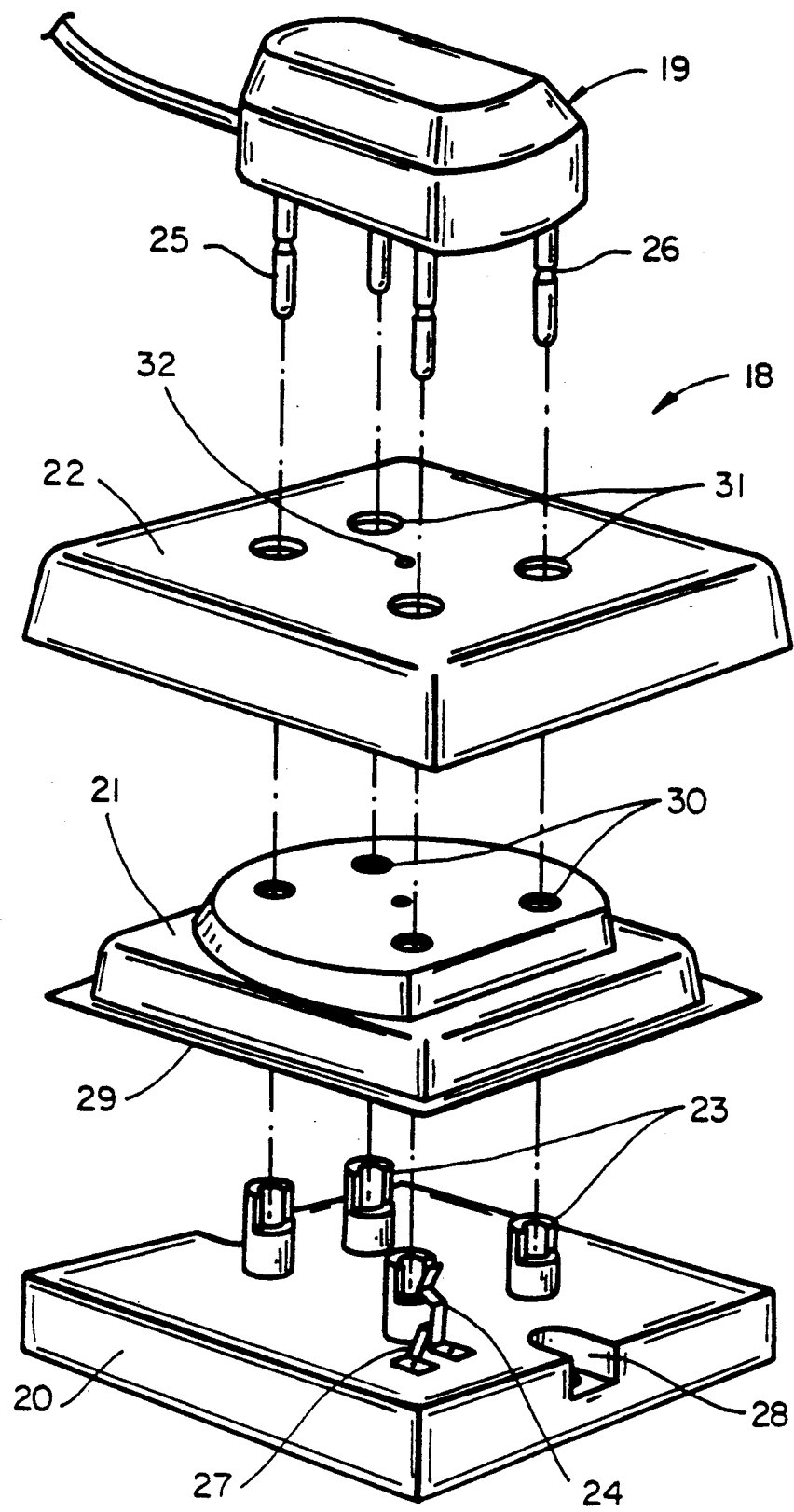
FIG_6

DEVICES FOR ELECTRICAL CONNECTION

RELATED APPLICATION

This application is a continuation-in-part of U.S. application Ser. No. 153,188. filed Feb. 8, 1988, the disclosure of which is incorporated herein by reference.

BACKGROUND OF THE INVENTION

This invention relates to devices for example a socket and a telephone junction box for interconnecting telephone wires, particularly subscriber drop wires. In particular, the invention allows for circuit testing both of the circuit from the box to the subscriber and of the circuit from the box to the central office. The invention may also be used in distribution cabinets and other places in a telephone network. Also, the socket may be used for electrical connections other than those in a telephone system.

Since, in general it will not be possible to provide for unbroken conductors to extend from a multi-wire distribution cable to a subscriber's telephone, some form of junction box has to be provided between them. For example, a junction box may be provided on the subscriber's premises to connect the wiring for which he is responsible to the wire for which the telephone company is responsible. It is desirable that such junction boxes allow connections to be made quickly and easily, and also that environmental protection be provided that will keep the contacts trouble-free for a sufficiently long time. There is, however, a further feature that is desirable. It is desirable that the line be testable, for example, by inserting a probe into the box to test for electrical continuity, and it is desirable that testing can be carried out on circuits either side of the junction box, for example from that junction box toward the subscriber and from junction box towards the central office. If this is to be done, it is necessary (and without sophisticated testing equipment) that the connections provided by the junction box be first broken. Unfortunately, in prior art junction boxes, where connection of more than one pair is provided for, it is the general practice for all connections to be made, and therefore broken, simultaneously. Thus, you loose use of your telephone while your neighbor's is being tested. Furthermore, often a circuit is broken by lifting a drop wire out of an insulation displacement conductor, and this can cause wear.

An example of a prior art connector for telephone conductors is given in U.S. Pat. No. 4,435,034 (Northern Telecom). In that example, all connections are made simultaneously and, although it is not suggested that they ever be broken again, if they were broken they would be broken simultaneously. A connector is disclosed for connecting at least two insulated conductors, for example telephone line conductors, the connector comprising a hollow body and a hollow cap, the cap optionally fitting into the body to form a hollow enclosure. The front of the body has apertures and guides for admission and guidance of conductors thereinto and the cap has insulation displacing terminals set in a top web. When body and cap are pressed together the terminals make contact with the conductive cores of the conductors. Terminal arrangements permit of butt, bridge, and tap connections. A modified form of body permits a tap to be made to a continuous conductor. The cap and body can be provided in a partially assembled or first stage assembly which permits insertion of conductors, the cap and body then being pressed to a fully assembled second stage assembly for connection of the conductors. An amount of sealing material may be injected into the body before assembly. A pumping action, occurs when the body and cap are pressed together, thus forcing the material around the conductors. Test ports may be provided in the body so that a probe may make electrical contact with terminals within the cap. No switching is, however, provided for.

With regard to sockets for mating electrical connection, the following prior art may be mentioned. U.S. Pat. No. 4,425,017 (Chan) discloses a plug and socket for use under water, in which the socket contains a hydrophobic gel composition comprising aluminum stearate, liquid paraffin and polyisobutylene. U.S. Pat. No. 4,662,962 (Uken) discloses a termination block sealing member having a continuous layer of insulating gel around its perimeter, through which electrical pins are passed. U.S. Pat. No. 4,718,678 (Vansant) discloses a method of sealing a terminal block in which a layer of gel faced by a gel-impregnated foam is forced over the surface of the block. U.S. Pat. No. 3,972,581 (Oldham) discloses an underwater electrical connector sealer using a semi-mobile compound. German Gebrauchsmuster G8515441 (Raychem) discloses a CATV box having an outlet containing a gel.

SUMMARY OF THE INVENTION

The present invention provides an electrical switch which comprises:
(a) a resilient first conductor to which a first wire can be electrically connected; and
(b) a second conductor to which a second wire can be electrically connected;
the switch having two stable configurations, namely:
  (i) in which the first and second conductors are held in electrical contact at least in part by resilient bias of the first conductor; and
  (ii) in which the first and second conductors are held apart at least in part by the resilience of the first conductor, configuration (ii) being reached from configuration (i) at least in part by relaxation of said resilient bias.

The invention also provides a telephone junction box for interconnection of electrical wires, which comprises:
  (i) a housing;
  (ii) at least four contacts to which four wires can be connected; and
  (iii) at least two bi-stable switches within the housing each of which can independently make or break a connection between a pair of said contacts.

The junction box of the invention preferably incorporates a switch of the invention.

The invention further provides an electrical socket comprising:
(a) a first part having an electrical contact for receipt of a pin of a plug;
(b) a hollow casing containing a sealing material, the casing having a hole therein through which the pin can pass, the casing being positionable adjacent the first part by deformation of the sealing material around the contact; and
(c) a cover having a hole therein through which the pin can pass, the cover being positionable around the casing with the hole in the cover aligned with the hole in the casing, and being securable to the first part.

The invention further provides an electrical socket comprising:
(a) a first part having a first electrical contact for receipt of a pin of a plug, and a second electrical contact that is operated by receipt of the pin in the first contact, the operation of the second contact not involving a wiping action; and
(b) a cover containing a sealing material and having a hole therein through which the pin can pass, the cover being positionable adjacent the first part by deformation of the sealing material around the contacts, and being securable to the first part.

DETAILED DESCRIPTION OF THE INVENTION

The second conductor of the switch defined above is preferably resilient and:
(a) in configuration (i) the first and second conductors are preferably held in electrical contact by resilient bias of the second conductor; and
(b) in configuration (ii) the first and second conductors are preferably held apart by the resilience of the second conductor, configuration (ii) being reached from configuration (i) by relaxation of the second conductor.

The first and second conductors are preferably of substantially similar shape (which includes substantial mirror images) and may conveniently be identical. Thus, the switch may be symmetrical, each conductor performing an identical function. The conductors may each consist essentially of a strip of resilient material, such as spring steel, and may include a protective insulating coating, leaving only contact areas exposed. In a preferred embodiment, the conductors are each stamped from a single sheet of material, and thus have a simple one-piece construction. They may be shaped by bending, etc. for convenient fixture to the housing, for improvement of the way in which they contact one another, and for strength, etc. Furthermore, I prefer that a wiping action be provided as the conductors come into contact, in order that the contact areas be cleaned. The switch may be provided with insulation-displacement means in order that an insulated wire be connectable thereto in a simple, quick fashion. The insulation-displacement means may comprise a slot having sharp edges thereto separated by the correct distance, such than an insulated wire slid laterally therein has its insulation, but not all of its conductive core, cut. Such insulation-displacement means may be integral with the conductor, and again the whole thing may be stamped from sheet metal.

The two conductors may each be generally elongate having one end fixed to some base, for example a part of the housing of the junction box. They may each be so shaped that in their unbiased, relaxed, configuration they do not touch one another. The switch is then in its "open" position. One (or both, preferably both) of the conductors may then be bent, by deforming it against its resilience such that it contacts the other, and contacts it in such a way that the resulting resilient bias is directed towards that other conductor thus maintaining electrical contact. One way in which this can be done is by latching the two conductors and hooking each around the back of the other. Where the switch is substantially symmetrical (each conductor having substantially the same shape and being deformed in substantially the same way as the other) this latching may be achieved simply by a twisting motion that flips a part of each conductor behind a corresponding part of the other. I prefer that such latching, and unlatching, be easily accomplished by hand or by using a readily available tool such as a screwdriver, or object such as a coin.

The switch preferably consists of conductors that directly interconnect, and preferably does not incorporate a third conductor whose job it is to bridge two stationary conductors in the "closed" position and which moves out of contact in the "open" position. Thus, this switch of the invention may be distinguished from the type of switch commonly used in domestic power supplies, etc.

The invention therefore further provides a two-part bistable switch, which comprises:
(i) a first resilient conductor to which a first wire can be connected; and
(ii) a second resilient conductor to which a second wire can be connected;
said second conductor having substantially similar size and shape to the first conductor, and being positioned relative to the first conductor such that the switch has substantial planar or rotational (preferably rotational) symmetry, the switch having two stable configurations, namely:
(i) in which the conductors are relaxed and are not in contact with one another (i.e. the circuit is open);
(ii) in which the conductors are deformed against their resilience, the resulting resilient bias causing a part of each conductor to be forced against a corresponding part of the other (i.e. the circuit is close).

I prefer that the operation of switching involves solely bending (which term includes twisting) of the conductor. Thus, preferably there is no hinging, axial rotation or sliding motion. In this way, the switch may be manufactured cheaply and may be extremely reliable. Preferably the switch includes no moving parts, bending of the conductors excepted, connection of wires to the conductors preferably involving insulation displacement as mentioned above. The switch employed in the junction box of the invention is preferably a two-part switch, particularly as defined above. Reference to "two-part" in this context means, of course, that the switching mechanism involves only two parts (the two conductors), and does not preclude a base or housing to which they may be attached, nor does it preclude rivets or other fixing means whereby they may be connected to the base or housing.

The switch is particularly useful for connection of telephone subscriber pairs to a distribution network, and several switches may be provided together. I prefer that the switches be provided in pairs, particularly in groups of 1-25, more preferably 1-10, especially 1-6, for example 2 pairs. The switches may be provided in a housing, particularly a two-part housing, one part of which may hold the switches, and the other part for example a lid be removable to enable the switches to be exposed for connection, disconnection, repair or testing. The lid or other removable part, when in position, may aid formation of electrical connections to the switch (for example it may help force wires into insulation-displacement connectors) or it may help to maintain the conductors of the switch in mutual electrical contact. In some embodiments, although not in those presently preferred, such action of a lid etc. may even be necessary for long-term electrical performance of the switches. It is important, however, that the lid be removable without failure of the electrical connections over the time period required to test or otherwise to work on selected ones of them.

I prefer therefore that a lid or other part be removable, and that when removed the switches are exposed and may be independently switched between their "off" and "on" configurations.

It may be desirable that the switches or other parts be further protected from the environment. This may be achieved by provision of a good seal between the two parts of the housing, and around wires that leave the housing through exit ports thereof. I prefer, however, that a sealing material be provided that can itself surround the switches. Such sealing material preferably comprises a gel for example based on a polyurethane or silicone. As an example, a material may be mentioned that is made by gelling curable polyurethane precursor materials in the presence of substantial quantities of mineral oil, vegetable oil or plasticizer or a mixture of two or more of them. Also, a suitable material may be made by curing reactive silicones with non-reactive extender silicones. The material may contain additives such as moisture scavengers (e.g. benzoyl chloride), antioxidants, pigments and fungicides. The material is preferably electrically-insulating and hydrolytically-stable.

I prefer that the sealing material has a cone penetration value as measured by ASTM D217-68, at 21 degrees C. of 100-350 ($10^{-1}$ mm), more preferably 150-350, especially 200-300. Cone penetration is measured on an undisturbed sample using a standard 1:1 scale cone (cone weight 102.5 g, shaft weight 47.5 g) the penetration being measured after 5 seconds. The material preferably has an ultimate elongation as measured by ASTM D638-80 at 21 degrees C. of at least 200%, preferably at least 500%, especially at least 750%. In the measurement of elongation, a type 4 die is used to cut the sample, and elongation is measured at 50 cm per minute. I have found that with such preferred materials it is possible easily to encapsulate the switch, and later to remove the sealing material cleanly. Thus, the switches and/or any contacts may be attached to a first part of a housing, and the sealing material fixed to a second part such that when the first and second parts are placed together the sealing material forms an environmental seal around the switches etc., and when the first and second parts are separated the sealing material is removed from the switches. Means may be provided for holding the first and second parts together, preferably so as to hold any such sealing material under compression around the switches etc.

BRIEF DESCRIPTION OF THE DRAWINGS

FIG. 1 shows a prior art junction box;
FIGS. 2a, 2b and 2c show a switch of the invention;
FIG. 3 shows a junction box of the invention;
FIG. 4 shows a preferred conductor for a switch of the invention;
FIG. 5 shows a junction box of the invention, incorporating a sealing material; and
FIG. 6 shows a socket of the invention in exploded view.

DETAILED DESCRIPTION OF THE DRAWINGS

FIG. 1 shows a junction box of the type disclosed in U.S. Pat. No. 4,435,034 (Northern Telecom). It comprises a base 1 into which wires 2 are positioned through holes 3 in one of its walls. A lid 4 is then pressed down onto the base 1 causing insulation-displacement means 5 to cut through insulation of the wires 2 thereby making contact with their conductive cores. Pairs of insulation-displacement means 5 are connector together by a connection 6, and as a result pairs of wires 2 are connected together when base 1 and lid 4 are assembled. A sealing material may be injected into the base when the base and lid are partially assembled. No suggestion is made of this design that it be re-entered, and if it were it is clear that all electrical connections would be broken.

A switch of the invention is illustrated in FIG. 2a in the open configuration and in FIG. 2b in the closed configuration. The switch comprises a resilient first conductor 8 and a second conductor 9, which is preferably also resilient. The conductors 8, 9 may be fixed to a base 10. Wires to be interconnected by the switch may be connected to the conductors 8, 9 by any suitable means. The conductors have contact portions 11 which can be seen to be apart in FIG. 2a and in physical and electrical contact in FIG. 2b. I prefer that in the open configuration (FIG. 2a) no part of conductor 8 contacts conductor 9, although this need not be so if either conductor is partially insulated. In the open configuration the conductors are preferably fully relaxed, i.e. not biased against their resilience. This need not however be the case since a conductor could be biased against some stop means. In either case, it can be seen that the resilience of the conductors is holding them apart since deformation against their resilience would be required to cause them to come into contact.

The switch may be operated by a simple rotating motion applied for example to extensions 12 (or other parts) provided for that purpose. Rotation as indicated by the arrows in FIG. 2a causes each contact 11 to be flipped behind the other. This can be done by means of a screwdriver etc. placed between extension 12. The contacts 11 may also act as a stop on which the end of the screwdriver may rest. The two conductors 8, 9 are now latched together and are deformed against their resilience such that they are held in mutual electrical contact by their resilient bias. The reverse process, namely opening of the switch, is achieved (at least in part, and generally after some twisting of the conductors) by relaxation of the resilient bias. As the contacts 11 come into engagement, some wiping motion preferably occurs thereby cleaning them.

FIG. 2c shows a preferred closed switch in plan view. The contacts 11 can be seen to be turned back to an orientation substantially perpendicular to the extension 12. Also, the contacts meet along extended length 11A, rather than at what would appear a point in plan view. This ensures better contact and is likely to result in more wiping action.

FIG. 3 shows a design of junction box incorporating four switches of the invention. The box may have means such as an internal channel for holding and providing strain relief to an incoming cable that is to be connected via the switches to several drop wires. The box comprises a base 13, housing the switches 7, and a lid 14. The base and lid may be held together by bolts as illustrated. The switches include insulation-displacement means 15 by means of which insulated wires may be connected to the conductors 8, 9. The conductors and insulation-displacement means are preferably stamped from a single piece of sheet metal. It can be seen that the switch can be opened and closed without disturbing the connection of drop wires to the insulation displacement connectors.

FIG. 4 shows an alternative design of conductor that may be used as conductors 8 and/or 9 in the switch or box of the invention. FIG. 4 shows the conductor relaxed, and when installed on some base it may become tensioned by the limb to which the arrow 8 points being bent to a substantially horizontal position. The conductor includes a contact 11, a part 12 to aid switching, and insulation-displacement means 15. An advantage of the design illustrated in FIG. 4 over that illustrated in FIGS. 2a and 2b is that the bending motion required to open or close the switch can be limited to a small part of the conductor, for example the base of the "V" the angle of which will simply vary. In the design of FIGS. 2a and 2b, the horizontal portions of the conductors may lift off the base, which may be undesirable.

A junction box is shown in FIG. 5 that incorporates a sealing material such as a gel. The box comprises a base 13 and a lid 14 to which the sealing material 16 is attached. A sealing material may additionally or alternatively be provided on the base. Parts of the switch to be encapsulated (for example the insulation-displacement means 15 illustrated, and/or the conductors) are exposed when the lid is removed, the lid taking the sealing material cleanly with it. The insulation displacement means may comprise slots that are horizontal (i.e. perpendicular or oblique to the direction of removal of the lid), as shown at the two right-hand instances in the figure, to avoid any tendency for removal of lid and material 16 to cause removal of wires 2. Other means may be provided to prevent such removal, for example some form of latch that traps the wires. Also, a portion of a sealing material 16 that is to encapsulate the means 15 may be separate from that which is to encapsulate the conductors 8, 9 of the switch. In that case, the conductors alone can be exposed for switching. The box may include some means to aid insertion of wires 2 into insulation displacement means 15, although this may be done by hand or with some simple tool such as a screwdriver. Such means may be provided as part of the lid, such that when the lid is closed it forces the wires into the correct position. The box may have some means, such as hooks 17 to retain the lid and/or keep the sealing material 16 under compression around the switches.

FIG. 6 shows an environmentally-sealed socket 18 of the invention to which may be connected a plug 19. Such a socket may be a subscriber box for use in a telephone system. The socket comprises a first part 20, generally having the form of a base, over which may be placed a hollow casing 21, and over which casing may be placed a cover 22. The casing 21 may comprise a thin, optionally transparent, material that may be flexible. Its thickness is preferably less than 2.0 mm, more preferably less than 1.0 mm, especially less than 0.75 mm. Its depth is preferably 1.5–3 cm and it is preferably from 3–8 cm by 3–8 cm in plan view. The cover 22 will preferably be substantially rigid and formed of the same material as the base 20. The base 20 may bear one or more means 23 for receiving pins of a plug 19. In the design illustrated the socket is for a four pin plug 19. The means 23 comprise an electrical contact 24, only one of which is shown in the drawing. The means 23 may comprise (as shown) a first part for locating a pin 25 of the plug 19, and a second part or contact 24 that makes connection to the pin 25 when located. Alternatively, a one part means 23 may be provided. The base may also comprise a connector (not shown) by means of which a wire or other conductor may be connected to contact 24. The pins 25 of the plug 19 may have a waisted portion 26 as illustrated to provide a snap-fit in the socket. A further contact 27 may be provided, electrical contact to which is broken when contact is made between a pin 25 and the contact 24. In the design illustrated, electrical contact between contact 27 and contact 24 is broken by the movement of contact 24 away from contact 27 by pin 25. It is often useful to provide for one contact being broken when another is made, particularly in telephone circuits, where it may be desirable to maintain a constant impedance or capacitance.

The base may be provided with means 28 whereby it can be attached to some surface, or through which conductors may leave the base.

The hollow casing 21 contains a sealing material 29 such that the casing 21 can be positioned adjacent the base with the contacts 24 (and 27 if provided) encapsulated within the sealing material. The sealing material should therefore be suitably deformable. Preferably the sealing material comprises a gel, and preferably it has the cone penetration and ultimate elongation values given above.

The casing 21 and the cover 22 may be provided with holes 30 and 31 through which pins 25 pass, the holes being aligned when the casing and the cover are properly positioned on the base. The pins then may be simply forced through sealing material within the casing 21. If the sealing material has the desired properties a plug 19 can be inserted into and withdrawn from the socket (and similarly the casing plus sealing material can be removed and replaced) very many times without loss or degradation of the sealing material. The holes 30 or 31 may be provided with a temporary closure that is removed prior to or parted by insertion of the pins.

In order that the sealing material properly encapsulates the contacts, it is desirable that it be kept under compression, especially by means of a force applied to the casing 21 forcing it downwards (as drawn) onto the base. This may be achieved simply by action of the cover which can be affixed to the base by means of a screw or bolt through a hole 32 thereof. It may be desirable that a hole 32 and, if provided, a corresponding hole in the base be specially sealed with a sealing material to prevent entry into the socket of contaminants such as water.

In some instances the casing 21 may be dispensed with, and a sealing material be provided directly in cover 21. I have found, however, that better sealing can be provided in a separate cover that can be shaped to direct the sealing material exactly as desired. Also, less sealing material is required, the cover can be removed for inspection (the casing and sealing material may be transparent) without excessively disturbing the sealing material, and there is less liklihood of sealing material exuding from holes 31 in the cover.

I have further found that the technique of sealing a socket disclosed herein works surprisingly well, allowing it to be used with contact designs and sealing material formulations where success would not be expected. In particular, simple contacts that function without a wiping or cleaning action (for example by two members simply bending towards or away from one another), may be encapsulated as illustrated with materials that might be expected to leave a film or deposit on the contact surfaces sufficient to increase contact resistance unacceptably. This, however, does not happen in my design, and the reason is not clear.

Thus, I am able to employ a sealing material based on an oil or two component system where some bleeding of one phase from another may occur (for example a mineral-oil extended polyurethane gel) and achieve excellent environmental protection.

I have conducted experiments by measuring contact resistance between pins 25 and contacts 24 (with the plug inserted) and between contacts 24 and 27 (with the plug withdrawn) as a function of the number of insertions and withdrawals of the plug. This was carried out in a salt-fog chamber over a period of six weeks, and operated generally in accordance with ASTM B-368-68 (1973), with control experiments carried out for comparison.

The tests showed that contact resistance between contacts 24 and 27 when protected by the casing 21 and sealing material showed no average change (the range was from an improvement of 0.7 milliohm to a deterioration of 1.0 milliohm). Without the protection, the average contact resistance deteriorated by 13.9 milliohms (the range was 2.2 to 45.6 milliohms).

The contact resistance between contact 24 and pins 25 deteriorated by 2.1 milliohms for the protected socket (the range was 1.8 to 2.6 milliohms) and deteriorated by 47.1 milliohms for the unprotected socket (the range being 3.7 to 124.8 milliohms).

In general, my invention may be used to provide a sealed version of prior art sockets, by the provision of a suitably shaped casing 21, and sealing material 29. In some cases, however, an additional means may be provided for forcing the casing 20 towards a base of the socket. Also, it may be desirable to provide a special cover 22 that allows a greater thickness of sealing material above the contacts. I prefer a thickness of at least 2 mm, preferably at least 3 mm, especially at least 4 mm. A further modification that may be desirable is strengthening of a cover 22, in order that the desired force may be provided on the sealing material by the cover. The cover may, for example have ribs for that purpose.

The socket of the invention preferably is for plugs having at least 2, preferably 2, 3 or 4 pins, but a similar design may be made for plugs having a single pin, for example coaxial plugs.

I claim:

1. An electrical switch which comprises:
    (a) a resilient first conductor to which a first wire can be electrically connected; and
    (b) a resilient second conductor to which a second wire can be electrically connected;
    the switch is capable of having two stable configurations in the absence of continued interaction by a third body, namely;
    (i) a first stable configuration in which the first and second conductors are held in electrical contact at least in part by the resilient bias of the first and second conductors; and
    (ii) a second stable configuration in which the first and second conductors are held apart at least in part by the resilience of the first and second conductors, configuration (ii) being reached from configuration (i) at least in part by the relaxation of said resilient bias and the rotation of at least one of said first and second conductors about an axis located between the first and second conductors in configuration (i), and wherein the axis is substantially perpendicular to the force exerted between the first and second conductors when in configuration (i).

2. A switch according to claim 1, in which in configuration (ii) the first conductor is substantially unbiased against said resilience.

3. A switch according to claim 1, in which change between configurations (i) and (ii) is achieved solely by bending of the first conductor and optionally also the second conductor.

4. A switch according to claim 1, in which the first and second conductors are of substantially similar shape.

5. A switch according to claim 4, in which the first and second conductors each consists essentially of a strip of resilient material.

6. A switch according to claim 1, which additionally comprises insulation-displacement means by means of which an insulated wire can be electrically-connected to at least one of said conductors.

7. A switch according to claim 6, in which an insulation-displacement means is an integral part of each conductor, each conductor being stamped from a single piece of metal.

8. A telephone junction box for interconnection of electrical wires, which comprises:
    (i) a housing;
    (ii) at least four contacts to which four wires can be connected; and
    (iii) at least a first and a second bi-stable switch within the housing each of which first and second switches can independently make and break a connection between a pair of contacts, wherein each bi-stable switch is capable of operating in a connected or a disconnected condition in the absence of a continued action by a third body.

9. A junction box according to claim 8 in which each said switch comprises:
    (a) a resilient first conductor; and
    (b) a second conductor;
    the switch having two stable configurations namely
    (i) in which the first and second conductors are held in electrical contact at least in part by resilient bias of the first conductor; and
    (ii) in which the first and second conductors are held apart at least in part by the resilience of the first conductor, configuration (ii) being reached from configuration (i) at least in part by relaxation of said resilient bias.

10. A junction box according to claim 8, in which each of said switches comprises a resilient first conductor and a second conductor, change between an open and a closed configuration of each switch being achieved solely by bending of one or more of said conductors.

11. A junction box according to claim 8, which additionally comprises four insulation-displacement means, by means of which insulated wires can be electrically connected to said conductors.

12. A junction box according to claim 8, in which each switch comprises a first and a second conductor, each of said conductors consisting essentially of a strip of resilient material.

13. A junction box according to claim 8 wherein an operation of the switch from the connected to the disconnected condition is achieved by a rotation of a pair of contacts about an axis located between the contacts in the connected condition, and wherein the axis is substantially perpendicular to the force exerted between the contacts when the switch is connected.

14. A junction box according to claim 8, having a sealing material that can form an environmental seal around each switch.

15. A junction box according to claim 14, in which the housing comprises:
   (a) a first part to which the contacts and the switches are attached; and
   (b) a second part that together with the first part forms an enclosure around the contacts and the switches,
the sealing material being fixed to the second part such that when the first and second parts are placed together the sealing material forms an environmental seal around each switch, and when the first and second parts are separated the sealing material is substantially removed from the switches.

16. A junction box according to claim 15, which additionally comprises means for maintaining the sealing material under compression around the switches.

17. A junction box according to claim 14, in which the sealing material comprises a gel.

18. A junction box according to claim 17, in which the gel comprises a material having a cone penetration value as measured by ASTM D217-68 at 21° C. of 100-350 ($10^{-1}$mm) and an ultimate elongation as measured by ASTM D638-80 at 21° C. of at least 200%.

19. A junction box according to claim 18 wherein an operation of the switch from the connected to the disconnected condition is achieved by a rotation of the pair of contacts about an axis located between the contacts in the connected condition, and wherein the axis is substantially perpendicular to the force exerted between the contacts when the switch is connected.

20. A two-part bi-stable switch, which comprises:
   (a) a first resilient conductor to which a first wire can be connected; and
   (b) a second resilient conductor to which a second wire can be connected;
said second conductor having substantially similar size and shape to the first conductor, and being positioned relative to the first conductor such that the switch has substantial planar or rotational symmetry; and
   the switch is capable of having two stable configurations, in the absence of a continued action by a third body, namely:
   (i) in which the conductors are relaxed and are not in contact with one another;
   (ii) in which the conductors are deformed against their resilience to cause a resulting resilient bias between a part of each conductor to be forced against a corresponding part of the other.

21. The switch according to claim 20 in which a movement from configuration (i) to configuration (ii) or configuration (ii) to configuration (i) is achieved by a rotation of at least the first resilient conductor or the second resilient conductor about an axis located between the conductors in configuration (i), and wherein the axis is substantially perpendicular to the force exerted between the first and second conductors when the switch is in configuration (ii).

* * * * *

UNITED STATES PATENT AND TRADEMARK OFFICE

CERTIFICATE OF CORRECTION

PATENT NO. : 5,013,877

INVENTOR(S) : James E. Jervis

DATED : May 7, 1991

It is certified that error appears in the above-identified patent and that said Letters Patent is hereby corrected as shown below:

Column 1, line 63, delete "of".

Column 4, line 31, replace "close).", by--closed).--.

Column 6, lines 4 to 5, replace "connector" by--connected--.

Signed and Sealed this

Twenty-sixth Day of April, 1994

Attest:

BRUCE LEHMAN

Attesting Officer     Commissioner of Patents and Trademarks